US008077741B2

(12) United States Patent
Takahashi et al.

(10) Patent No.: US 8,077,741 B2
(45) Date of Patent: Dec. 13, 2011

(54) MULTIPLEXING NETWORK SYSTEM AND DIGITAL INFORMATION TRANSFERRING METHOD

(75) Inventors: Masahiro Takahashi, Iwaki (JP); Masahiko Mitomi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 384 days.

(21) Appl. No.: 12/186,331

(22) Filed: Aug. 5, 2008

(65) Prior Publication Data

US 2009/0097505 A1  Apr. 16, 2009

(30) Foreign Application Priority Data

Oct. 12, 2007  (JP) ................................. 2007-266423

(51) Int. Cl.
*H04J 3/16* (2006.01)
(52) U.S. Cl. ............................ 370/468; 370/465; 725/37
(58) Field of Classification Search .................. 370/231, 370/232, 235, 236.1, 465, 468; 348/148; 725/37, 116
See application file for complete search history.

(56) References Cited

U.S. PATENT DOCUMENTS

| 6,522,672 | B1  | 2/2003  | Matsuaki et al. |
| 7,251,255 | B1* | 7/2007  | Young ............................ 370/468 |
| 7,748,019 | B1* | 6/2010  | Teichner ......................... 725/75 |
| 2002/0194596 | A1* | 12/2002 | Srivastava ....................... 725/37 |
| 2005/0055485 | A1* | 3/2005  | Shindo ........................... 710/124 |
| 2005/0104963 | A1* | 5/2005  | Nishiyama et al. ............ 348/148 |
| 2006/0026302 | A1  | 2/2006  | Bennett et al. |
| 2006/0171689 | A1* | 8/2006  | Smith ............................. 386/125 |
| 2007/0183450 | A1  | 8/2007  | Kawanishi |
| 2009/0196338 | A1* | 8/2009  | Ali et al. .................. 375/240.01 |
| 2009/0288129 | A1* | 11/2009 | Wolfe et al. .................... 725/116 |

FOREIGN PATENT DOCUMENTS

| EP | 0782365 | 7/1997 |
| EP | 0782365 A2 | 7/1997 |
| JP | 2002-057638 | 2/2002 |
| JP | 2004-104529 | 4/2004 |
| JP | 2004-241885 | 8/2004 |
| WO | WO0031971 | 6/2000 |
| WO | WO2008020479 | 2/2008 |

OTHER PUBLICATIONS

Chaaban et al., *Dynamic Reconfiguration for High Level In-Vehicle Applications Using IEEE-1394*, 2004 IEEE Intelligent Transportation Systems Conference, Washington, D.C. Oct. 3-6, 2004.
European Search Report dated Jan. 29, 2009, from the European Patent Office in related European Application No. 0817675.3-2416.

* cited by examiner

*Primary Examiner* — Aung S Moe
*Assistant Examiner* — Awet Haile
(74) *Attorney, Agent, or Firm* — Brinks Hofer Gilson & Lione

(57) ABSTRACT

In a multiplexing network system in which media devices are interconnected through a digital transmission path, during system startup, a device that is used as a master device holds management information for recognizing bands used by media devices connected to the digital transmission path and management information for recognizing what type of data is output/received between the media devices. During the system startup, the master device refers to the management information to set the compression rates of data streams transferred between the media devices to be variable.

16 Claims, 6 Drawing Sheets

MULTIPLEXING NETWORK SYSTEM AND DIGITAL INFORMATION TRANSFERRING METHOD

1. RELATED APPLICATION

The present application claims priority to Japanese Patent Application Number 2007-266423, filed Oct. 12, 2007, the entirety of which is hereby incorporated by reference.

BACKGROUND OF THE INVENTION

1. Field of the Invention

The present invention relates to technology in which multiple types of digital information, such as video and audio, are multiplexed and transmitted/received between media devices connected to a network. More specifically, the present invention relates to a multiplexing network system and a digital-information transferring method which use a specific bus that allows synchronous transfer in real time, for example, a multiplexed-data bus based on IEEE 1394 (hereinafter, the bus will also be simply referred to as a "1394 bus").

2. Description of the Related Art

In a multiplexing network system, a specification (a bandwidth) thereof restricts the number and/or data sizes of streams multiplexed and transferred. Thus, in general, a new device that exceeds the number of media devices connected, the number being contemplated during design, cannot be added to the multiplexing network system (i.e., the system cannot be expanded). That is, even if an attempt is made to add a media device that was not intended in the system design, the addition is not easy (the addition is practically impossible). This is because, at the stage of system design, a media device or media devices that would be added in the future are assumed in addition to originally connected media devices, the compression rates of streams for the media devices are set to have fixed values allowing for the media device(s) to be added and a band on the network is allotted thereto.

In order to add a media device intended during the design, a band is assigned to the media device with a compression rate set during the design, based on an instruction from a master device connected to the network, and when the device is actually connected, video/audio data is transmitted in the band pre-assigned during the design. On the other hand, a sink device, such as a display, connected to the network receives the video/audio data in that band on the network and performs playback (such as screen display and sound output), based on an instruction from the master device.

Such a multiplexing network system is also incorporated into vehicles, and is realized as, for example, infotainment systems. The term "infotainment" is a combination of "information" that refers to information (e.g., navigation information) required for the vehicles and "entertainment" that refers to entertainment information (e.g., video/audio information of various sources) offered to the drivers and passengers (particularly users in the rear seats). Currently, OEMs (original equipment manufacturers) have strong demands for multi HMIs (human machine interfaces) in a next-generation vehicle-mounted infotainment system, thus increasing a need for a multiplexed-data bus, such as a 1394 bus.

A recent trend is that, for example, video data size (the amount of information) is increasingly becoming large and digitization of an entire system is progressing. In view of such a situation, it is necessary to provide a multiplexing network system with more flexibility.

As technologies related to the above-described known technology, for example, there is a technology in which a significance for each type of video, audio, and so on or a significance for each object that appears in video, audio, and so on is determined and a relatively large amount of information is assigned to a higher significance to perform multiplexing, as is disclosed in Japanese Unexamined Patent Application Publication No. 2002-57638. Also, as is disclosed in Japanese Unexamined Patent Application Publication No. 2004-104529, for a vehicle-mounted network system in which multiple networks provided in a vehicle are interconnected by a media converter apparatus, there is a technology in which the media converter apparatus constantly detects an available bandwidth in the network to which data is to be output, compresses and converts image data into a compression format that can be output in the detected available bandwidth, and outputs the compressed and converted data to the network. In addition, as disclosed in Japanese Unexamined Patent Application Publication No. 2004-241885, for an information transfer system in which multiple types of digital information are multiplexed and synchronously transferred between multiple processing devices connected to a network, there is a technology that allows, when a bandwidth required for the synchronous transfer is not ensured in the network, the bandwidth to be assigned in the range of a currently available bandwidth to start synchronous transfer.

As described above, in the known technologies, when a multiplexing network system is configured, a media device that is not intended during system design cannot be added later, because of the restriction on the availability of the band. Thus, if the unintended media device is added to the system, a band that is specified by a specification of the system is exceeded, and consequently, not only video/audio data of the added device but also video/audio data of other preinstalled media devices cannot be transferred in that band.

That is, the known technologies have a problem in that a new media device that exceeds the number of media devices, the number being set at the system design stage, cannot be added to an existing multiplexing network system to expand the system. The in-band transfer becoming impossible due to exceeding the band is not preferable in terms of efficient use of the band, and also leads to impairment of flexibility of the system configuration.

Problems of the known technologies will now be described with reference to FIG. 6.

FIG. 6 is a diagram schematically illustrating an example of use of a band (an isochronous area) on a 1394 bus. The 1394 bus uses a maximum of 100 μs (an isochronous area) of one transfer cycle (125 μs), as illustrated, to transfer streams. In the illustrated example, four streams of four sources A, B, C, and D occupy the period of 100 μs. In order to add a stream (i.e., to add a new media device) to such a multiplexing network system in which bands are assigned to respective media devices (e.g., the sources A, B, C, and D), it is necessary to reduce the sizes of currently transferred streams and to ensure a band for the new stream.

While reducing the stream sizes requires the use of a compression technology, the compression rates of streams for media devices intended during the system design are set to have fixed values in the known technologies, as described above. Therefore, even when an attempt is made to later add a media device not intended during the design, a bandwidth that is appropriate for a band for the added media device cannot be ensured and the band is consequently exceeded. As a result, there are problems in that a band cannot be efficiently used, flexibility of the system configuration is impaired, and the system cannot be expanded.

SUMMARY OF THE INVENTION

The present invention has been made in view of such problems of the known technologies, and an object of the present invention is to provide a multiplexing network system and a digital-information transferring method which can efficiently use a band without exceeding the band even when a media device not intended during system design is added and which can also contribute to improving the flexibility of the system configuration.

In order to overcome the above-described problems, one embodiment of the present invention provides a multiplexing network system in which multiple media devices are interconnected through a specific digital transmission path and digital information is multiplexed and synchronously transferred between the media devices. The multiplexing network system includes a master device that is one of the multiple media devices and holds first management information for recognizing a band used between the media devices connected to the digital transmission path during system startup and second management information for recognizing what type of data is output or received between the media devices, and that sets compression rates of data streams transferred between the media devices to be variable by referring to the first and second management information.

According to the multiplexing network system of an embodiment of the present invention, the media device that is used as the master device recognizes the band used between the media devices (on the digital transmission path) connected to a current system during system startup, based on the first management information, and recognizes what type of data is output/received between the media devices, based on the second management information. That is, by referring to the first and second management information, the master device sets the compression rates of data streams transferred between the media devices to be variable to thereby change the sizes of the respective data streams. That is, the master device assigns bands corresponding to the compression rates to the respective data streams simultaneously transferred in the current system.

With this arrangement, even when a new media device not intended during the system design is added, a bandwidth that is appropriate for the additional stream can be ensured. Thus, it is possible to efficiently use the band without exceeding the band. In addition, it is possible to prevent the occurrence of exceeding the band regardless of the presence/absence of an added media device, thus making it possible to contribute to improving the flexibility of the system configuration.

Another embodiment of the present invention provides a digital-information transferring method for multiplexing, in a network system in which multiple media devices are interconnected through a specific digital transmission path, digital information and synchronously transferring the digital information between the media devices. The digital-information transferring method comprises holding, in one of the media devices that is used as a master device, first management information for recognizing a band used between the media devices connected to the digital transmission path during system startup and second management information for recognizing what type of data is output or received between the media devices; and setting compression rates of data streams transferred between the media devices to be variable by referring to the first and second management information during the system startup and outputting digital information, converted in accordance with the set compression rates, to the digital transmission path.

Features of other configurations of the multiplexing network system and the digital-information transferring method according to the present invention, specific operations based thereon, advantages, and so on will be described below in conjunction with embodiments of the present invention.

DESCRIPTION OF THE PREFERRED EMBODIMENTS

A preferred embodiment of the present invention will be described below with reference to the accompanying drawings.

Figure 1:
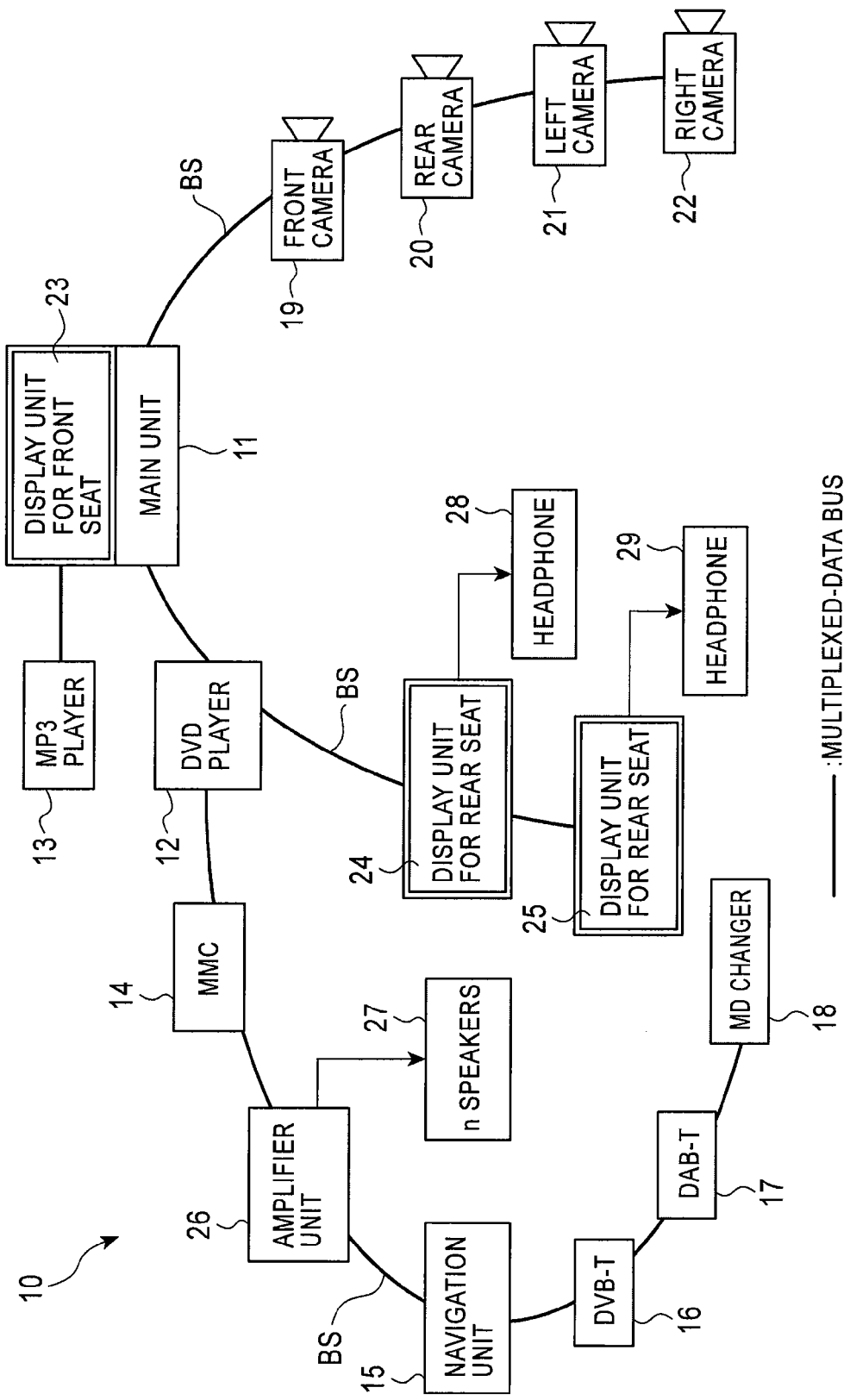
FIG. 1 is a diagram schematically showing the entire configuration of a multiplexing network system according to a first embodiment of the present invention.

FIG. 1 is a diagram schematically showing the entire configuration of a multiplexing network system according to one embodiment of the present invention. The present embodiment is directed to a case in which a multiplexing network system is configured as a vehicle-mounted audio/video (A/V) navigation system.

When digital information is transferred through a network, information such as video (particularly moving pictures) and audio needs to be transferred at certain periods in real time, unlike data that are typically handled by computer systems. As a scheme that allows such real-time transfer, isochronous (synchronous) transfer based on IEEE 1394 standardized by the IEEE (Institute of Electrical and Electronics Engineers) is available. In the present embodiment, a multiplexed-data bus (a 1394 bus) based on IEEE 1394 is used to configure a network system.

As shown in FIG. 1, a multiplexing network system 10 according to the present embodiment includes multiple digital media devices, specifically, a main unit 11 used as operating means for front seats, a DVD player 12, an MP3 player 13, a multimedia changer (MMC) 14, a navigation unit 15, a terrestrial digital video broadcast (DVB-T) unit 16, a terrestrial digital audio broadcast (DAB-T) unit 17, a mini disc (MD) changer 18, digital cameras 19, 20, 21, and 22, a monitor (a display unit 23) for the front seats, monitors (display units 24 and 25) for rear seats, and an amplifier unit 26. The digital cameras 19, 20, 21, and 22 are disposed at predetermined front, rear, left, and right portions of the vehicle to monitor its vicinity. The devices 11 to 26 are connected in series or in a tree structure through an IEEE 1394 cable (a 1394 bus) BS, which serves as a digital transmission path. Thus, each of the media devices 11 to 26 has a dedicated connector that is connectable to the 1394 bus BS.

In the present embodiment, of the media devices 11 to 26, the main unit 11 is used as a master device and all of the other devices 12 to 26 are used as slave devices for executing respective functions under the control of the master device (i.e., the main unit 11). Of the slave devices 12 to 26, each of the devices 12 to 22 serves as a source device in that it supplies (or outputs) video/audio information to an external unit, and each of the devices 23 to 26 serves as a sink device in that it receives video/audio information from an external unit and performs predetermined processing (such as screen display and audio output).

The main unit 11, which is used as the master device, is provided in the form of an operation panel at an approximate middle of a center console so that the main unit 11 can be used by both the driver and a passenger in the front passenger's seat. The front-seat display unit 23 is disposed above the main unit 11. The rear-seat display units 24 and 25 are disposed at back portions of the headrests of the front seats, respectively, and are also provided with corresponding user interfaces (e.g., operation buttons arranged on front panels of the monitors 24 and 25, operation screens displayed on the screens of the monitors 24 and 25, and/or remote controllers linked to the monitors 24 and 25 via infrared communication).

In addition, n speakers 27 (n is a required number) are provided at predetermined positions in the vehicle cabin and are connected to the amplifier unit 26. Headphones 28 and 29 used for listening to sound corresponding to video information displayed on the rear-seat display units 24 and 25 are connected to the rear-seat display units 24 and 25, respectively. The headphones 28 and 29 are provided in the vicinity of the corresponding rear seats and are used through connection to connector terminals provided at the front panels of the display units 24 and 25. Alternatively, in consideration of the users' convenience, the headphones 28 and 29 may be wireless headphones. In this case, the headphones 28 and 29 are linked to the display units 24 and 25 via infrared communication and RF (radio frequency) communication.

In the system 10 configured as described above, the user interface (the operation buttons, the operation screen, the remote controller, and so on) for each rear seat is used to give an instruction for selecting a source device to cause its audio/video information to be output and to give an operation instruction to the selected source device. In turn, the operation state of the selected or changed device based on the instruction is displayed on the screen of the display unit 24 or 25 and/or output to the headphone 28 or 29 via the 1394 bus BS and the main unit 11. In this case, source devices to which the selection/operation instructions can be given from the rear seats do not include the navigation unit 15 and the vehicle-vicinity monitoring cameras 19 to 22. With respect to the front seats, video information can be received using the user interface (the main unit 11) and the monitor 23, as in the rear seats; however, there is a difference in that audio information is output via the speaker 27 instead of a headphone.

Any transfer system has a physical restriction on a bandwidth needed when data is transferred through a network and thus requires control of the bandwidth. In IEEE 1394, a required bandwidth used for information for synchronous transfer is obtained prior to start of a transfer operation to thereby manage the bandwidth. In order to achieve such a function, the IEEE 1394 interface unit has multiple registers that store various types of control information needed for synchronous transfer based on IEEE 1394. One of the registers is a specific register for registering an allowable bandwidth indicating a bandwidth (i.e., the amount of information) that can be currently used for the synchronous transfer. That is, a device that issues an instruction for synchronous transfer or executes synchronous transfer can determine whether or not a required bandwidth used for the synchronous transfer to be executed from now on is ensured, by reading the allowable bandwidth registered in the specific register prior to start of a synchronous transfer operation.

Thus, the multiplexing network system 10 according to the present embodiment also has such a bandwidth managing function. In the present embodiment, of the media devices 11 to 26 included in the system 10, the main unit 11 (which serves as the master device) has the bandwidth managing function. That is, the main unit 11 serves as an IRM (isochronous resource manager) based on IEEE 1394 to constantly manage resources in the system 10. More specifically, the main unit 11 recognizes how much band (the number of streams and the sizes thereof) is actually used between the media devices (on the 1394 bus BS) connected to the system 10 immediately after the startup of the system 10, in other words, how much bandwidth (an allowable bandwidth) that can be currently used for the synchronous transfer remains.

In addition, the master unit (the main unit 11) manages what type of data flows from which source device to which sink device based on a user instruction, as described below. For example, in the example of digital-information transfer processing shown in FIG. 5, the master unit (the main unit 11) recognizes that data output from the DVD player 12, which is one of the source devices, is transferred to a WVGA monitor (the rear-seat display unit 24), which is one of the sink devices; data output from the navigation unit 15, which is one of the source devices, is transferred to an SVGA monitor (the front-seat display unit 23), which is one of the sink devices; and data output from the DVB-T unit 16, which is one of the source devices, is transferred to a QVGA monitor (the rear-seat display unit 25), which is one of the sink devices.

Figure 6:
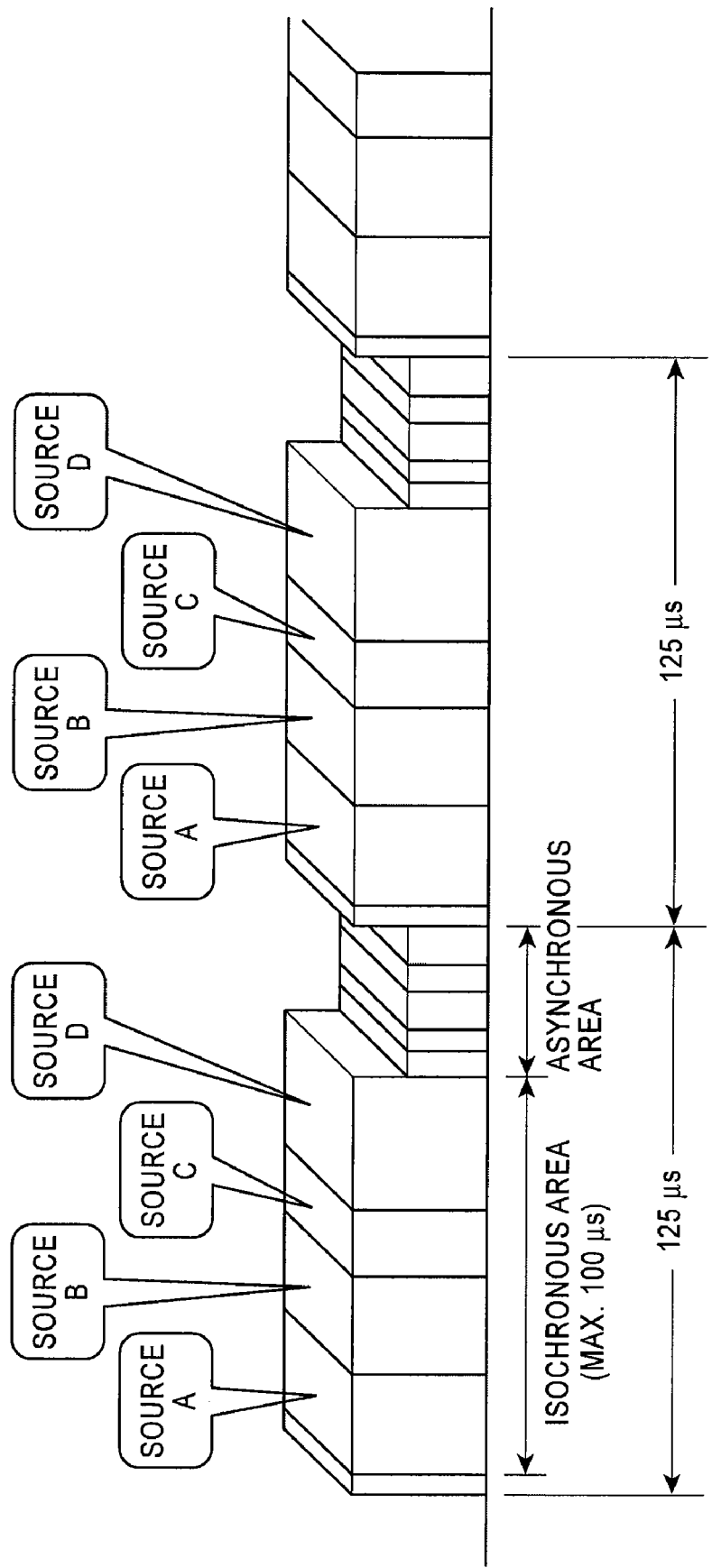
FIG. 6 is a diagram showing an example of use of a band (an isochronous area) on a 1394 bus.

Further addition of a sink device, such as a display, to the system configuration shown in FIG. 1 results in an increase in the number of streams transferred to the 1394 bus BS. In this case, when the size of the stream transferred from each source device is fixed, as described in connection with FIG. 6, the band can be exceeded and the expansion of the system is restricted.

Accordingly, in the present embodiment, the main unit 11, which serves as the master device, recognizes bandwidths used between media devices (on the 1394 bus BS) connected to a current system (i.e., the system 10 shown in FIG. 1 or a system resulting from further addition of a media device to the system 10) and sets the compression rate of a data stream transferred between a source device and a corresponding sink device to be variable, as described below, so as to change the size of each stream. That is, the main unit 11 assigns a band corresponding to the compression rate that is set to be variable for each stream flowing in the current system, so as to ensure, even when a media device that was not intended during system design is added, a bandwidth that is appropriate for a bandwidth required by the added media device and so as to prevent exceeding the band. With this arrangement, it is possible to efficiently use the band, to provide the system configuration with more flexibility, and to expand the system.

Figure 2:
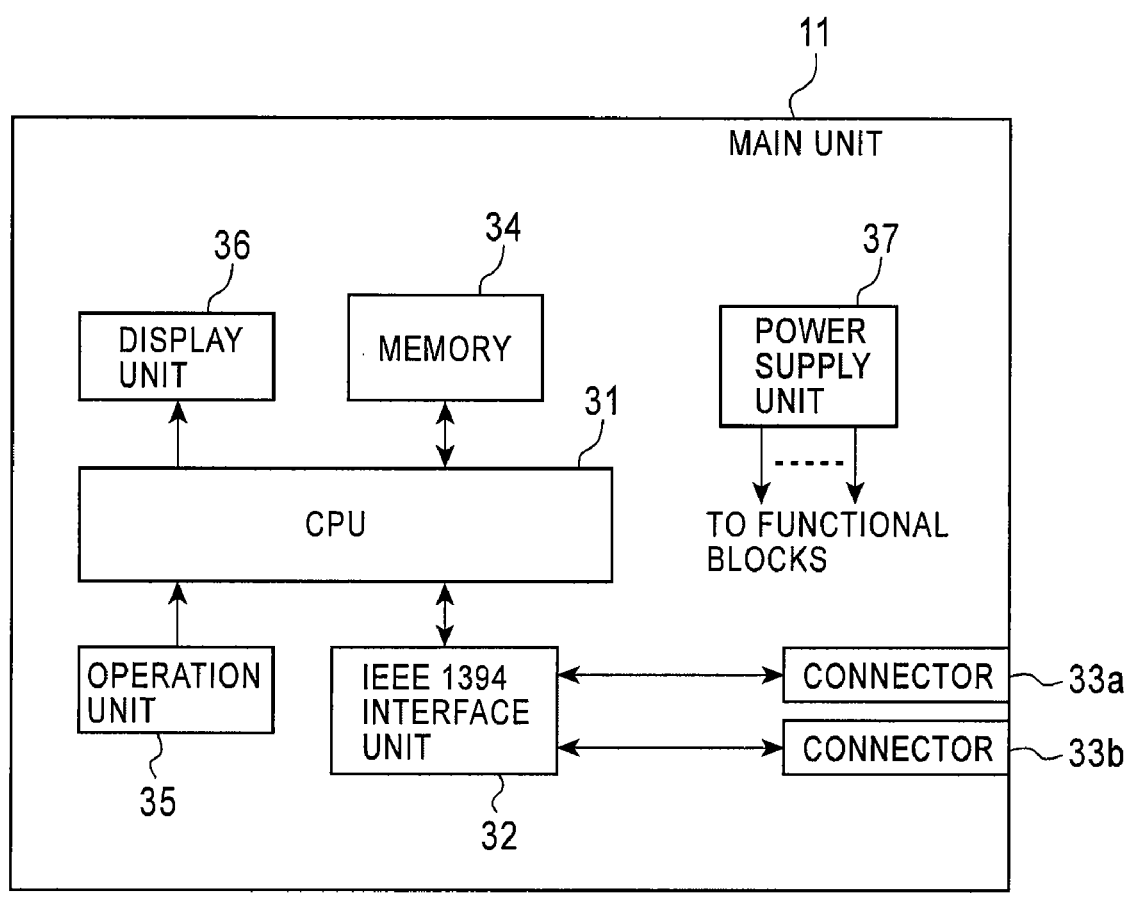
FIG. 2 is a block diagram showing the internal configuration of a main unit (a master device) in the network system shown in FIG. 1.

Next, the internal configuration of the main unit 11 that serves as an IEEE-1394 based IRM (isochronous resource manager) in the system 10 will be described with reference to FIG. 2.

As shown, the main unit 11 includes a central processing unit (CPU) 31, an IEEE 1394 interface unit 32 (also simply referred to as an "interface unit" hereinafter) that serves as a communicating means, dedicated connectors 33a and 33b for connecting the interface unit 32 to the 1394 bus BS (FIG. 1), a memory 34, an operation unit 35 used as a user interface, a display unit 36, and a power supply unit 37.

The IEEE 1394 interface unit 32 has the form of an LSI chip and serves as a block for transmitting/receiving signals that comply with an IEEE 1394 standard that allows a synchronous transfer operation. The interface unit 32 converts the format of control signals and/or data supplied via the CPU 31 into a predetermined communication format and outputs the converted signals and/or data to the 1394 bus BS (FIG. 1) via the connectors 33a and 33b. The interface unit 32 also receives various types of data, signals, and so on transferred from another media device through the 1394 bus BS, performs predetermined demodulation processing on the data and so on, and then sends the resulting data and so onto the CPU 31.

The interface unit 32 further incorporates the above-described bandwidth managing function and has a specific register (not shown) for achieving the function. The register stores information indicating how much band is actually used between devices (on the 1394 bus BS) connected to the current system, in other words, information about an allowable bandwidth indicating a bandwidth (the amount of information) that can be currently used for synchronous transfer. The information will be referred to as "bandwidth management information," for convenience of description below. The bandwidth management information is updated in real time in accordance with the operation state and so on of each media device connected to the current system.

The memory 34 includes a flash memory or the like and is used to store, for example, data and/or information processed by the CPU 31. According to the present invention, the memory 34 stores information indicating what type of data is supplied from which source device to which sink device based on a user instruction. More specifically, the memory 34 stores information (referred to as "device-specific operation state management information," for convenience of description below) indicating an operation state that represents what type of data was output/received between the source device and the corresponding sink device when the system 10 was stopped (i.e., when the power was turned off). Possible examples of the device-specific operation state management information include a unit type indicating which of the devices was used, sound volume and sound quality indicating adjustment values of sound volume and sound quality, for example, when sound was listened to in the case of an audio unit, and unit-specific detailed information indicating a detailed operation state of each device.

That is, each source/sink device receives data associated with a selection/operation instruction supplied from each user interface through the 1394 bus BS, sets/modifies its own operation state based on the received data, and outputs information indicating a result (the current operation state) of the setting/modification to the 1394 bus BS. Based on the output information, the main unit 11 (the CPU 31) manages what type of data flows from which source device to which sink device, and stores a description of the management in the memory 34 as the device-specific operation state management information.

The operation unit 35 is used by the user(s) in the front seat(s) to input various selection/operation instructions to each source/sink device and is provided with various operation keys, buttons, and so on. Based on data supplied via the CPU 31, the display unit 36 displays information indicating a selection/operation state and so on (e.g., a reception frequency and so on for terrestrial digital audio broadcast reception in the case of the DAB-T unit 17). The power supply unit 37 receives power supplied from a vehicle-mounted battery, which is not illustrated, and supplies a required power-supply voltage to each functional block in the main unit 11 during the startup of the system 10.

The CPU 31 controls the entire main unit 11. In essence, in response to a selection/operation instruction supplied via the operation unit 35 or a selection/operation instruction supplied from the user interface (the operation buttons, the operation screen, the remote controller, and so on) for the rear-seat monitor 24 or 25 through the 1394 bus BS, the connector 33a or 33b, and the interface unit 32, the CPU 31 performs control for transferring video/audio information output from the corresponding source device to the corresponding sink device. The CPU 31 also performs control for causing the display unit 36 to display information indicating a selection/operation state or the like.

In addition, as processing according to the present invention, the CPU 31 refers to the bandwidth management information stored in the interface unit 32 and the device-specific operation state management information stored in the memory 34 to control a digital-information transfer operation performed between the media devices (the source device and the sink device), as described below.

Figure 3:
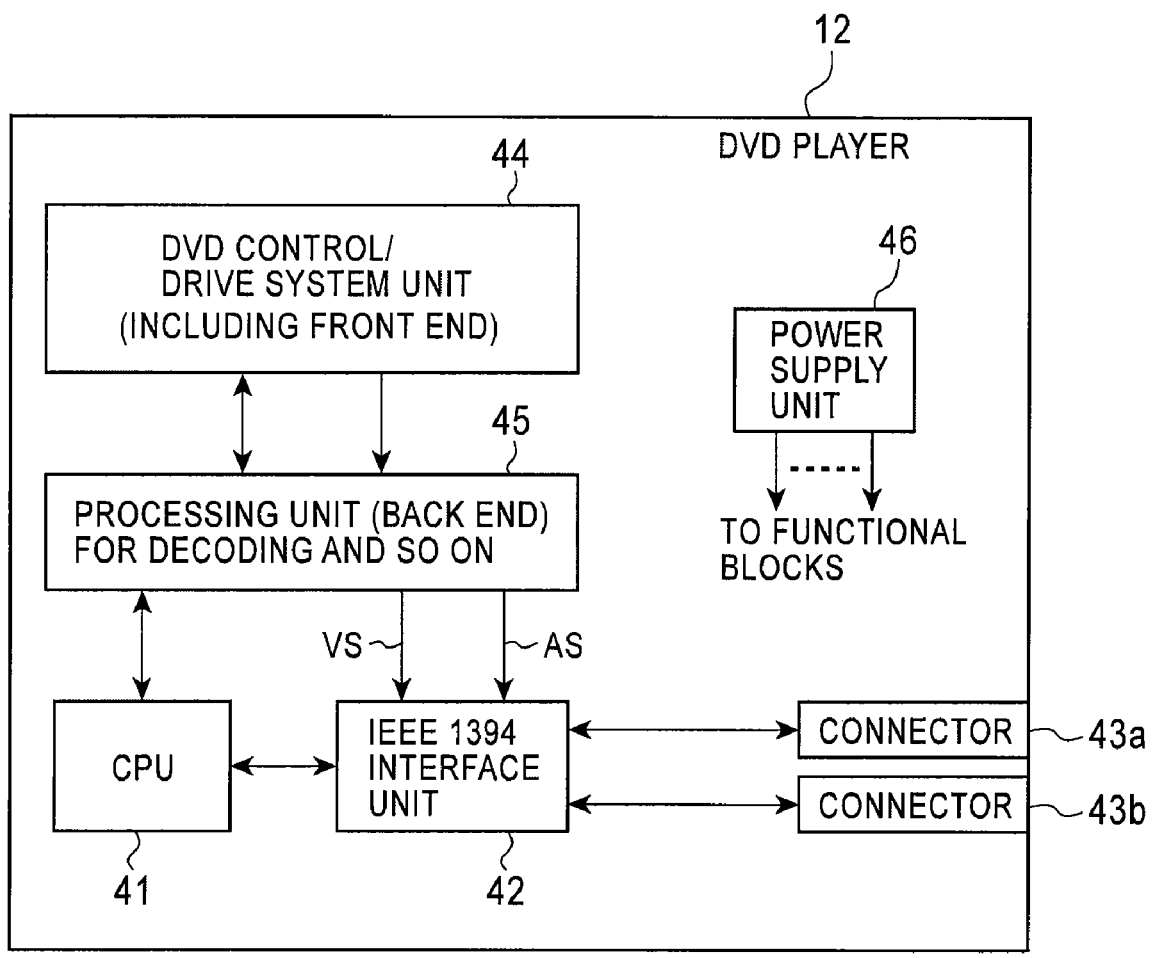
FIG. 3 is a block diagram showing the internal configuration of a DVD player, which is one example of a source device added to the network system shown in FIG. 1.

Next, the internal configuration of a DVD player, which is one example of a source device added to the system 10, will be described with reference to FIG. 3. In essence, the DVD player that is newly added has substantially the same configuration as the preinstalled DVD player 12 (FIG. 1), except for a slightly improved function compared thereto. Thus, the configuration illustrated in FIG. 3 will be described as the configuration of the DVD player 12.

As shown, the DVD player 12 includes a CPU 41, an IEEE 1394 interface unit 42 (also simply referred to as an "interface unit") that serves as a communicating means, dedicated connectors 43a and 43b for connecting the interface unit 42 to the 1394 bus BS (FIG. 1), a DVD control/drive system unit (including a front end) 44, a processing unit (a back end) 45 for decoding and so on, and a power supply unit 46.

Similar to the interface unit 32 in the main unit 11, the IEEE 1394 interface unit 42 serves as a block (an LSI chip) for transmitting/receiving signals that comply with the IEEE 1394 standard that allows a synchronous transfer operation. The interface unit 42 has an MPEG encoder function to compress and convert BT.656 video signals VS and linear PCM (pulse code modulation) audio signals AS, supplied from the back end 45, into an MPEG-2 stream, and outputs the data stream to the 1394 bus BS (FIG. 1) via the connectors 43a and 43b. A command specifying a compression rate set to be variable by the main unit 11 is transferred to the 1394 bus BS, as described below, and the interface unit 42 receives the command via the connectors 43a and 43b and outputs the command to the CPU 41.

The CPU 41 controls the entire DVD player 12. In essence, in cooperation with the master device (the main unit 11) and the interface unit 42, the CPU 41 performs control for receiving data associated with a selection/operation instruction supplied from each user interface through the 1394 bus BS, for setting/changing its own operation state based on the received data, and for outputting information indicating a result (the current operation state) of the setting/changing to the 1394 bus BS.

In addition, as processing according to the present invention, in cooperation with the main unit 11 and the interface unit 42, the CPU 41 controls a digital-information transfer operation performed with the sink device, as described below. More specifically, the CPU 41 decodes a description (the compression rate specified by the main unit 11) of the command transferred from the interface unit 42 and sends a notification indicating a result of the decoding to the interface unit 42. In response to the notification, the interface unit 42 performs data conversion in accordance with the indicated compression rate, during compression and conversion of the BT.656 video signals VS and linear PCM audio signals AS into an MPEG-2 stream, and outputs the stream to the 1394 bus BS.

The DVD control/drive system unit 44 and the back end 45 have components that are included in a typical DVD player. The DVD control/drive system unit 44 includes a spindle motor for rotating and driving a disk (DVD); an optical pickup for reading data recorded on the disk; a feed motor for moving a sled, provided with the optical pickup, in the radial direction of the disk; an RF amplifier for variably amplifying RF signals output from the optical pickup and for demultiplexing control signals for focus search, tracking, and so on; a servo control unit for performing focus control and tracking control of the optical pickup, drive control of the feed motor, and rotation control of the spindle motor; and so on.

The back end 45 includes a digital signal processor (DSP) for performing digital-signal processing on playback RF signals supplied from the RF amplifier; a stream demultiplexing unit for demultiplexing data signals output from the DSP into an audio bit stream, a main-picture (video information) bit stream, and a sub-picture (character information) bit stream; decoders, including an audio decoder, for performing decoding processing on the respective demultiplexed bit streams (the outputs of the audio decoder are linear PCM audio signals AS); a video processor for digitally combining a main picture and a sub picture (the outputs thereof are video signals VS); and so on.

As in the case of the main unit 11, the power supply unit 46 receives power supplied from the vehicle-mounted battery and supplies a required power-supply voltage to each functional block in the DVD player 12 during the startup of the system 10.

Next, the internal configuration of a display unit, which is one example of a sink device added to the system 10, will be described with reference to FIG. 4. In essence, the display unit that is newly added has substantially the same configuration as the pre-installed rear-seat display unit 24 (25), except for a slightly improved function compared thereto. Thus, the configuration illustrated in FIG. 4 will be described as the configuration of the rear-seat display unit 24 (25).

Figure 4:
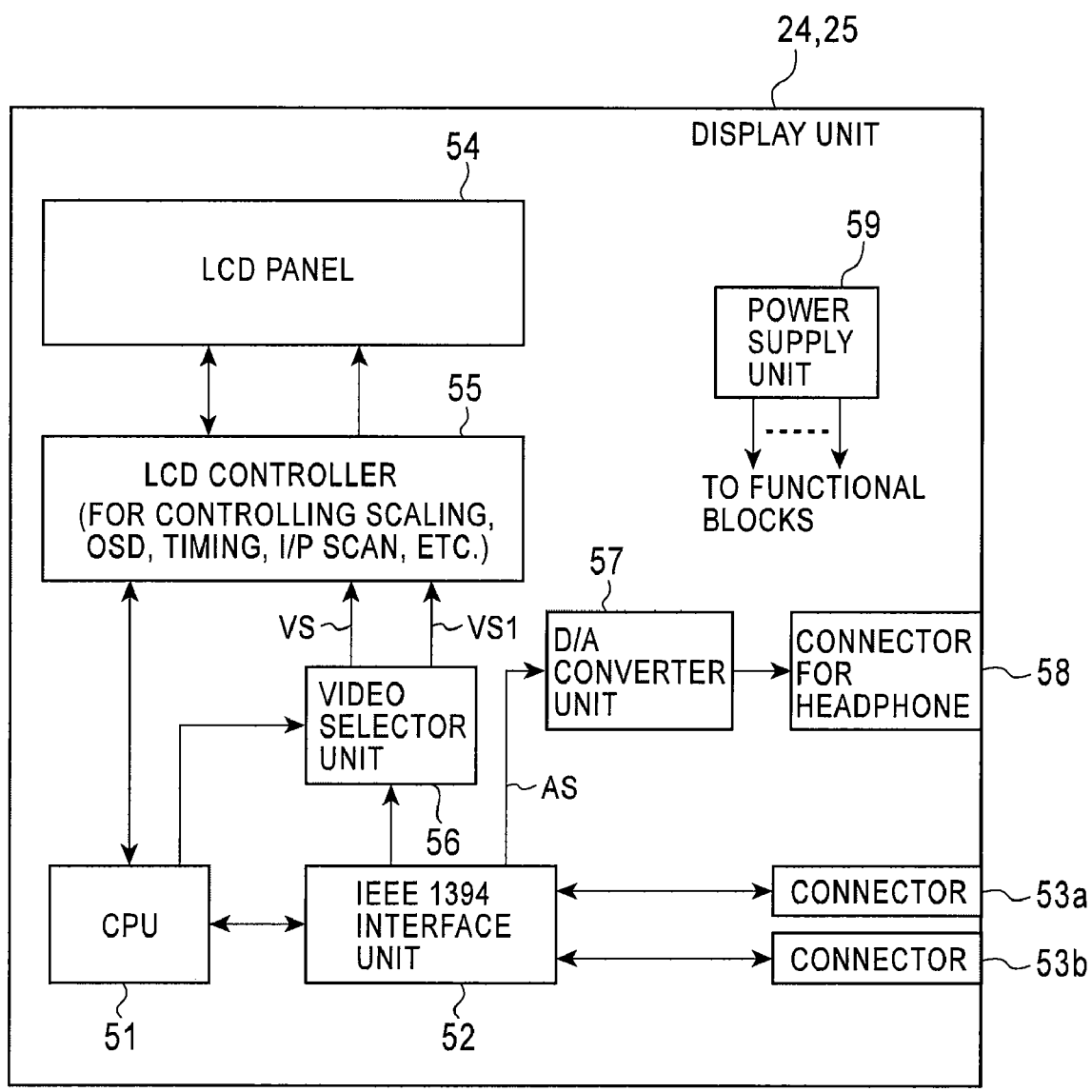
FIG. 4 is a block diagram showing the internal configuration of a display unit, which is one example of a sink device added to the network system shown in FIG. 1.

As shown in FIG. 4, the display unit 24 (25) includes a CPU 51; an IEEE 1394 interface unit 52 (also simply referred to as an "interface unit") that serves as a communicating means; dedicated connectors 53a and 53b for connecting the interface unit 52 to the 1394 bus BS (FIG. 1); an LCD panel 54 that serves as a monitor screen for displaying video; an LCD controller 55 for controlling display of the video; a video selector unit 56 for selectively outputting two types of video signals (BT.656 video signals and RGB video signals) supplied from the interface unit 52, under the control of the CPU 51; a D/A (digital/analog) converter unit 57 for converting linear PCM (digital) audio signals AS, supplied from the interface unit 52, into analog audio signals; a connector 58 for connecting the head phone 28 (29) for listening to the analog audio signals; and a power supply unit 59.

Under the control of the CPU 51, the LCD controller 55 performs the display control required for the monitor screen (the LCD panel 54), for example, performs control for scaling, OSD (on-screen display), timing, interlace/progressive (I/P) scan for either of interlace scanning or progressive scan, and so on. The LCD controller 55 further converts the video signals (BT.656 video signals VS and RGB video signals VS1), output from the video selector unit 56, into analog signals, and supplies the analog signals to the LCD panel 54. As in the case of the main unit 11, the power supply unit 59 receives power supplied from the vehicle-mounted battery and supplies a required power-supply voltage to each functional block in the display unit 24 (25) during the startup of the system 10.

Similar to the interface unit 32 in the main unit 11, the IEEE 1394 interface unit 52 serves as a block (an LSI chip) for transmitting/receiving signals that comply with the IEEE 1394 standard that allows a synchronous transfer operation. The interface unit 52 has an MPEG-2 decoder function. Thus, upon receiving data (an MPEG-2 stream) transferred from the source device through the 1394 bus BS (FIG. 1) and the connectors 53a and 53b, the interface unit 52 extracts the received data. That is, the interface unit 52 decompresses the MPEG-2 stream into video signals (BT.656 video signals and RGB video signals) and linear PCM audio signals AS. The video signals and linear PCM audio signals AS thus decompressed (extracted) are supplied to the video selector unit 56 and the D/A (digital/analog) converter unit 57, respectively. The MPEG-2 stream transferred from the source device through the 1394 bus BS contains data compressed and converted by the source device in accordance with the compression rate specified by the main unit 11.

The CPU unit 51 controls the entire display unit 24 (25). In essence, in cooperation with the master device (the main unit 11) and the interface unit 52, the CPU 51 performs control for receiving data associated with a selection/operation instruction supplied from each user interface through the 1394 bus BS, for setting/changing its own operation state based on the received data, and for outputting information indicating a result (the current operation state) of the setting/changing to the 1394 bus BS.

In addition, as processing according to the present invention, in cooperation with the main unit 11 and the interface unit 52, the CPU 51 controls a digital-information transfer operation performed with the source device, as described below. More specifically, the CPU 51 causes video of information (the video/audio data compressed and converted in accordance with the compression rate specified by the main unit 11) received from the 1394 bus BS via the interface unit 52 to be displayed on the monitor screen (the LCD panel 54) via the LCD controller 55 and also causes audio of the received information to be output to the headphone 28 (29) via the D/A converter 57 and the connector 58.

In the multiplexing network system 10 of the present embodiment configured as described above, the CPU 31 in the master device (the main unit 11) corresponds to a controlling means, the IEEE 1394 interface unit 32 and the memory 34 correspond to a storing means, the bandwidth management information corresponds to first management information, and the device-specific operation state management information corresponds to second management information.

According to the multiplexing network system 10 of the present embodiment, as described above, the main unit 11 (which serves as the master device) recognizes a band used between devices (on the 1394 bus BS) connected to the current system during the system startup, based on the bandwidth management information, and further recognizes what type of data flows from which source device to which sink device based on a user instruction, based on the device-specific operation state management information. With reference to the bandwidth management information and the device-specific operation state management information, the main unit 11 sets the compression rate of data (stream) transferred between the media devices to be variable to thereby change the size of each stream. That is, the main unit 11 assigns bands corresponding to the compression rates to streams that flow simultaneously in the current system.

With such a function, even when a media device that was not intended during the system design is added later, it is possible to ensure a bandwidth that is appropriate for the additional stream and it is possible to efficiently use the band without exceeding the band. In addition, it is possible to prevent the occurrence of exceeding the band regardless of the presence/absence of an added media device, thus making it possible to provide the system configuration with more flexibility.

A description will now be given of application examples for a case in which the compression rate of a stream is varied with reference to the above-described management information.

First Application Example

In accordance with the scale (the number of streams) of multiplexed-data transfer performed between the media devices (on the 1394 bus BS) connected to the current system (the system 10 shown in FIG. 1 or a system resulting from the addition of a media device to the system 10), the compression rates of the streams are set to be variable so that the streams fit within an allowable bandwidth.

More specifically, as described below, the CPU 31 in the main unit 11 refers to the above-described management information during the system startup to detect the number of streams that are to flow in the current system simultaneously and changes and sets the compression rates of individual streams so that the streams fit within corresponding bandwidths obtained by dividing the allowable bandwidth by the number of streams. With this arrangement, even when a new media device is added to the system 10, a bandwidth that is appropriate for the stream of the added device is also ensured. This allows the stream, together with the streams of the pre-installed media devices, to be transferred in the band (i.e., prevents exceeding the band) and allows the band to be efficiently used.

Second Application Example

In accordance with the screen display sizes of the monitors (the display units 23, 24, and 25 in the example shown in FIG. 1) connected to the current system, the compression rates of the streams are set to be variable so that the streams fit within the allowable bandwidth.

More specifically, with reference to the above-described management information during the system startup and further based on specification information (such as resolutions and screen display sizes), the CPU 31 in the main unit 11 detects the screen display sizes of the monitors connected to the current system and changes and sets the compression rates of the streams with respect to the corresponding source devices in accordance with the detected monitor sizes.

For example, when multiple streams are to be simultaneously transferred to respective monitors including both a large-screen monitor and a small-screen monitor, it is common to assign a relatively large bandwidth to the large-screen monitor in order to achieve a certain level of high-quality images. In such a case, it is not necessarily required to supply excessively-high-definition signals to the small-screen monitor (e.g., a 3-inch monitor), and it is sufficient to supply even a relatively small amount of information (i.e., a relatively small bandwidth) thereto. Thus, the amount of information (i.e., bandwidth) corresponding to the amount of information that has become unnecessary for the small-screen monitor can be allotted to the large-screen monitor.

Accordingly, in the second application example, based on the above-described management information and the specification information, the main unit 11 determines the ratio of the data sizes of video-information streams output from the source devices corresponding to the respective monitors, and changes and sets the bitrate of each stream in accordance with the ratio. For example, when one VGA monitor and two QVGA monitors are connected to the system, the ratio of the VGA monitor and the QVGA monitors is 4:1:1. Thus, in accordance with the ratio, the allowable bandwidth is divided into 4/6, 1/6, and 1/6 to assign the compression rates of the streams.

Even when three monitors are connected in such a manner, three types of streams may not necessarily be flowing on the 1394 bus BS. For example, there may also be a case in which a stream X is transferred from one source device to a large-screen monitor A (assumed to be a VGA monitor) and a stream Y is transferred from another source device to two small-screen monitors B and C (assumed to be QVGA monitors). When two types of streams X and Y are transferred to three monitors A, B, and C in such a manner, the compression rates are set based on the bandwidth of the monitor that requires a higher specification (in this case, the X stream for the monitor A). In this case, since the ratio of the screen display sizes of the monitors A and B (or C) is 4:1, the allowable bandwidth is divided into 4/5 and 1/5 in accordance with the ratio to set the compression rates of the streams X and Y.

According to the second example, as described above, when it is sufficient to assign a relatively small amount of information (a small bandwidth) to a small-screen monitor that does not require high-definition signals, the compression rate of each stream is set to be variable so that the amount of information (bandwidth) corresponding to the amount of information reduced by the assignment is allotted to the large-screen monitor (i.e., a relatively large amount of information (a large bandwidth) is assigned to the large-screen monitor). This arrangement, therefore, can efficiently use the band and also can improve the display quality of the large-screen monitor.

A specific example of the second application example will be described below with reference to FIG. 5.

Figure 5:
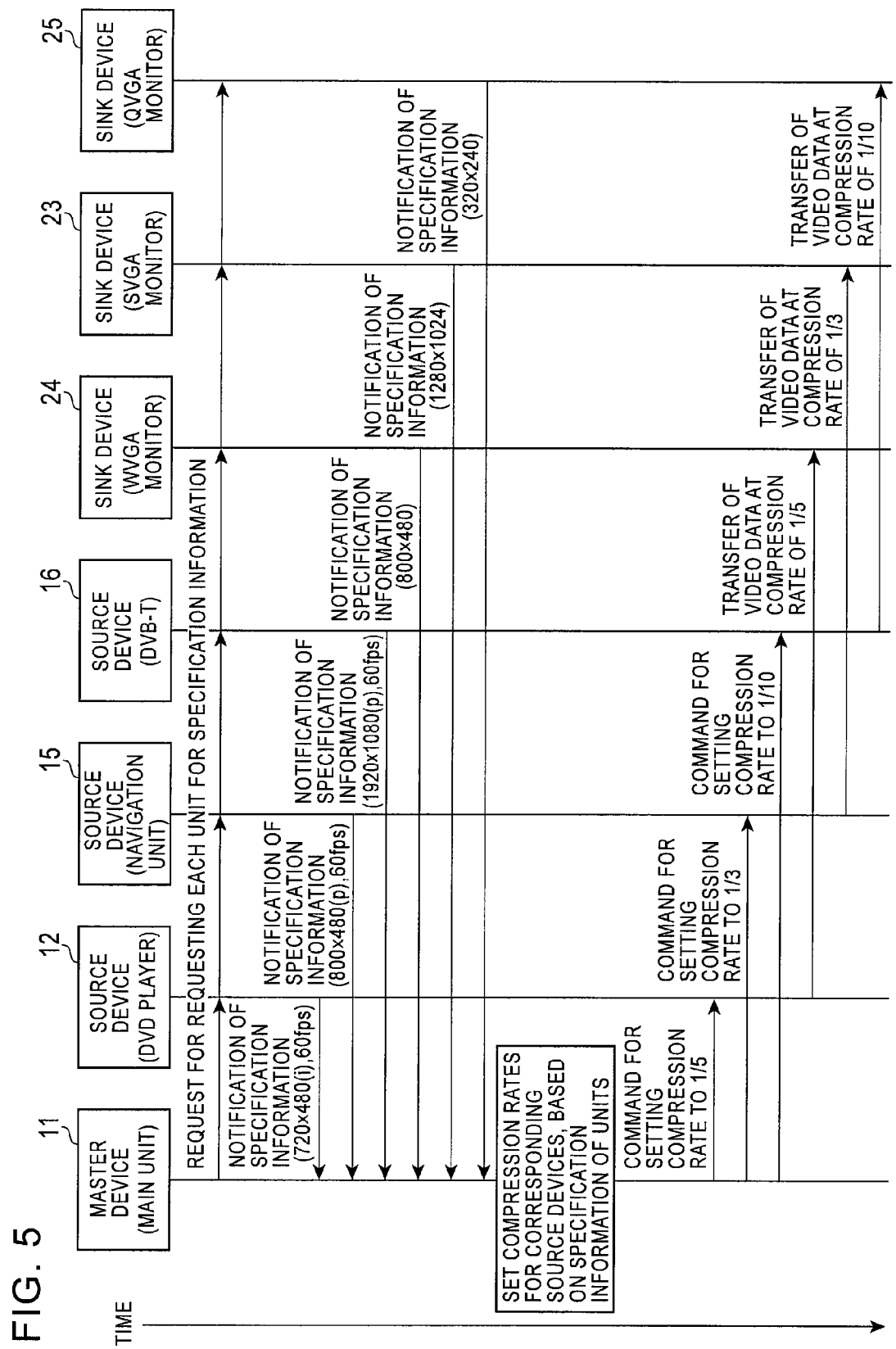
FIG. 5 is a flow diagram showing one example (an operation sequence) of processing associated with digital-information transfer performed between media devices in the network system shown in FIG. 1.

FIG. 5 shows one example of processing for digital-information transfer performed between the media devices in the system 10. The illustrated example shows a case in which digital information is transferred among the master device (the main unit 11), three source devices (the DVD player 12, the navigation unit 15, and the DVB-T unit 16) and three sink devices (the front-seat monitor 23 and the rear-seat monitors 24 and 25). These units are interconnected through the 1394 bus BS, as shown in FIG. 1. The example illustrated in FIG. 5 shows a case in which the front-seat monitor 23 is an SVGA monitor, the rear-seat monitor 24 is a WVGA monitor, and the rear-seat monitor 25 is a QVGA monitor. For reference's sake, the SVGA monitor has a resolution (display capability) of 1280×1024 pixels, the WVGA monitor has a resolution (display capability) of 800×480 pixels, and the QVGA monitor has a resolution (display capability) of 320×240 pixels.

First, during system startup (i.e., when the ignition key is operated (ACC "ON") and the system receives power supplied from the vehicle-mounted battery), a power-ON status request signal for checking the power-supply state of each of the units (the source devices 12, 15, and 16 and the sink devices 23, 24, and 25) is sent from the master device (the main unit 11) to the unit through the 1394 bus BS, not shown in FIG. 5. In response to the power-ON status request signal, a power-ON status signal is output from each of the units 12, 15, 16, 23, 24, and 25 to the 1394 bus BS when the power of the unit is ON.

In this case, when the power-ON status signal is not output from any of the units to the 1394 bus BS, the main unit 11 can determine that the power of that unit is OFF.

Next, as illustrated, the master device (the main unit 11) outputs to the bus 1394 bus BS a request signal for requesting from each of the units 12, 15, 16, 23, 24, and 25 its specification information (such as a resolution and a screen display size). In response to the request signal, the specification information of each of the units 12, 15, 16, 23, 24, and 25 is output therefrom to the 1394 bus BS.

In the illustrated example, a notification of specification information indicating that video information having a resolution of 720×480 pixels is to be output at a transmission rate of 60 fps by interlace scanning (i) is sent from the DVD player 12, a notification of specification information indicating that video information having a resolution of 800×480 pixels is to be output at a transmission rate of 60 fps by progressive scanning (p) is sent from the navigation unit 15, and a notification of specification information indicating that video information having a resolution of 1920×1080 pixels is to be output at a transmission rate of 60 fps by progressive scanning (p) is sent from the DVB-T unit 16. Also, a notification of specification information indicating that video information having a screen display size of 1280×1024 pixels can be received is sent from the SVGA monitor 23, a notification of specification information indicating that video information having a screen display size of 800×480 pixels can be received is sent from the WVGA monitor 24, and a notification of specification information indicating that video information having a screen display size of 320×240 pixels can be received is sent from the QVGA monitor 25.

In this case, the master device (the main unit 11) recognizes what type of data flows from which source device to which sink device, based on the device-specific operation state management information stored in the memory 34, as described above. In this case, the master device recognizes that video data of the DVD player 12 is transferred to the WVGA monitor 24, video data of the navigation unit 15 is transferred to the SVGA monitor 23, and video data of the DVB-T unit 16 is transferred to the QVGA monitor 25.

With reference to the device-specific operation state management information and the bandwidth management information stored in the 1394 interface unit 32 and based on the specification information obtained from the units 12, 15, 16, 23, 24, and 25, the master device (the main unit 11) sets compression rates of data streams to be compressed, converted, and output with respect to the corresponding source devices (the DVD player 12, the navigation unit 15, and the DVB-T unit 16) and sends commands specifying the compression rates. In the illustrated example, a command for setting the compression rate to 1/5 is sent to the DVD player 12, a command for setting the compression rate to 1/3 is sent to the navigation unit 15, and a command for setting the compression rate to 1/10 is sent to the DVB-T unit 16.

In response to the corresponding commands, the source devices 12, 15, and 16 compress and covert the video/audio signals into MPEG-2 streams and output the MPEG-2 streams. During the processing, the source devices 12, 15, and 16 convert the data in accordance with the compression rates (1/5, 1/3, and 1/10) specified by the main unit 11 and output the converted data to the 1394 bus BS.

The sink devices 24, 23, and 25, which correspond to the source devices 12, 15, and 16, respectively, receive the video data (the data compressed and converted in accordance with the compression rates specified by the main unit 11) transferred through the 1394 bus BS and display video on the corresponding monitor screens.

Third Application Example

When the power of any of the monitors (the display units 23, 24, and 25 in the example of FIG. 1) that are connected to the current system is OFF, no stream for that monitor flows and the amount of information (bandwidth) corresponding to the amount of information that has become unnecessary for the stream can thus be allotted to other monitors in operation. With this arrangement, the monitors to which the bandwidth is allotted (particularly, a large-screen monitor) have a bandwidth that is larger than a bandwidth that should normally be allotted. Thus, it is possible to achieve a high image quality (i.e., to improve the display quality).

More specifically, the CPU 31 in the main unit 11 refers to the above-described management information during the system startup and issues a request for checking the power-supply state to each unit, as described above in connection with the second application example (the operation sequence shown in FIG. 5). Further, when no response is received from a particular one (the monitor in this case) of the units, the CPU 31 can determine that the power of the monitor is OFF. Based on the determination, the data compressions of streams for the other monitors in operation are reduced (i.e., the compression rates are changed and set to be small). This allows the user(s) to enjoy higher-definition video on the monitors.

Fourth Application Example

As a modification of the above-described second application example, the compression rates of streams may be set to be variable in accordance with video transmission rates (frame rates) so that the streams fit within the allowable bandwidth.

More specifically, the CPU 31 in the main unit 11 refers to the above-described management information and the specification information during the system startup and determines the ratio of the frame rates (i.e., bitrates) for video data output from the source devices corresponding to the monitors (the display units 23, 24, and 25 in the example shown in FIG. 1), and changes and sets the compression rates of the individual streams in accordance with the ratio. For example, when streams of high-resolution video (with a transmission rate of 60 fps) and analog video (with a transmission rate of 30 fps) are to be transferred, data transfer of the high-definition video must be performed at twice the bitrate of the analog video and the allowable bandwidth is thus divided into 2/3 and 1/3 in accordance with the ratio (2:1) of the bitrates to assign the compression rates of the streams.

This arrangement allows the user to enjoy higher-definition video on the monitor (in this case, the monitor that displays high-resolution video), while achieving efficient user of the band, as in the case of the second application example.

As described above, features of the present invention are that one (the master device) of multiple media devices connected to the network system through a digital transmission path recognizes a band used on the digital transmission path during system startup, further recognizes what type of data is output/received between the media devices, sets the compression rates of data streams transferred between the devices to be variable to thereby change the sizes of the streams, and assigns bands corresponding to the compression rates. Although the description in the above embodiment has been given of an example in which the multiplexing network system according to the present invention is applied to a vehicle, the scope of application of the present invention is not necessarily limited to a vehicle, as is apparent from the features of the present invention.

In principle, the present invention is also applicable to any configuration of a multiplexing network system in which multiple media devices are interconnected through a specific digital transmission path (such as an IEEE 1394 bus), digital information is multiplexed and synchronously transferred between the media devices, and one (the master device) of the devices has functions for storing the above-described bandwidth management information and the device-specific operation state management information and for setting the compression rates of the streams to be variable by referring to the management information.

Although a case in which the 1394 bus BS is used as a digital transmission path that interconnects the media devices 11 to 26 has been described by way of example in the above embodiment, the present invention is also applicable to a case in which a transmission cable that does not comply with the IEEE 1394 standard is used for the interconnection, as is apparent from the features of the present invention. In such a case, however, it is necessary to provide each of the media devices 11 to 26 with an interface function (i.e., a function that allows video data, audio data, and synchronization signals to be multiplexed and transferred) that is equivalent to the above-described IEEE 1394 interface unit.

Although a case in which the main unit 11 is provided with the IRM function based on IEEE 1394 has been described by way of example in the above embodiment, the present invention does not necessarily restrict the IRM function to the main unit 11, as is apparent from the features of the present invention. For example, it is possible to provide any of the other media devices 12 to 26, which are connected through the IEEE 1394 bus BS, with the IRM function. In such a case, the media device provided with the IRM function is used as the master device.

Although a case in which the media devices that constitute the multiplexing network system 10 include the source devices 12 to 22 and the sink devices 23 to 26 shown in FIG. 1 has been described by way of example in the above embodiment, the types of source device and sink device are not limited to the illustrated example. For example, the media devices may include a TV receiver, a next-generation DVD player, a CD changer, and so on as source devices. Similarly, although the monitors serving as the sink devices in the above-described embodiment are separately connected as a monitor (the display unit 23) for the front seats and monitors (the display monitors 24 and 25) for the rear seats, the number of monitors installed and the configuration of the connections are not necessarily limited thereto.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A multiplexing network system in which a plurality of media devices, including a master device, at least one source device, and at least one sink device, are interconnected through a digital transmission path, and digital information is multiplexed and synchronously transferred between the media devices, the system comprising:

bandwidth management information stored in memory and accessible by the master device for providing an indication of a bandwidth of a data stream for each of the media devices;

device-specific state management information stored in the memory and accessible by the master device for providing an indication of a type of data output or received by the media devices, and a control device in the master device configured to set compression rates of the data streams transferred between the media devices to be variable, based on the bandwidth management information and the device-specific state management information, by dividing a maximum bandwidth of the digital transmission path by a sum of bandwidths of the data streams for all media devices;

wherein the at least one source device is configured to output video information to the digital transmission path, and during the output of the video information, the source device compresses and converts the video information in accordance with the compression rate set by the control device, and outputs the compressed and converted video information;

wherein the at least one sink device is configured to receive the video information from the digital transmission path and display the video information on a screen, wherein the at least one sink device decompresses a compressed and converted video stream transferred from the source device through the digital transmission path, and displays the decompressed video stream on the screen;

wherein the control device accesses the bandwidth management information and device-specific state management information during system startup, and when the control device determines that a selected at least one sink device is in a powered-off state, the control device performs control so that the compression rates of the data streams are relaxed with respect to the source devices corresponding to other sink devices in a powered-on state, and relatively large bandwidths are assigned thereto; and wherein when the control device determines that the selected at least one sink device has changed from a powered-on state to a powered-off state, the control device accesses the device-specific state management information and saves detailed operational state information corresponding to the at least one sink device.

2. The multiplexing network system according to claim 1, wherein by referring to the bandwidth management information and device-specific state management information during the system startup and based on specification information transferred from each of the source devices and the sink devices connected to a current system, the control device detects a screen display size of each sink device and changes and sets the compression rate of the data stream with respect to the corresponding source device in accordance with the detected screen display size.

3. The multiplexing network system according to claim 2, wherein, when data streams are simultaneously transferred to a first sink device having a relatively large screen display size and a second sink device having a relatively small screen display size, the control device performs control so that the compression rate of the data stream is changed and set to be small with respect to the source device corresponding to the first sink device and a relatively large bandwidth is assigned thereto and performs control so that the compression rate of the data stream is changed and set to be large with respect to the source device corresponding to the second sink device and a relatively small bandwidth is assigned thereto.

4. The multiplexing network system according to claim 2, wherein, by referring to the bandwidth management information and device-specific state management information during the system startup and further based on the specification information, the control device detects frame rates of respective video data output from the sources devices corresponding to the respective sink devices and changes and sets the compression rates of the respective data streams in accordance with a ratio of the detected frame rates.

5. The multiplexing network system according to claim 1, wherein, by referring to the bandwidth management information and device-specific state management information during the system startup, the control device detects the number of data streams simultaneously transferred between the media devices connected to a current system and changes and sets the compression rates of the data streams so that the data streams fit within corresponding bandwidths obtained by dividing an allowable bandwidth by the detected number of streams.

6. The multiplexing network system according to claim 1, wherein the digital transmission path comprises a transmission cable that complies with an IEEE 1394 standard.

7. The multiplexing network system according to claim 1, wherein the multiplexing network system is configured as a vehicle-mounted system.

8. The multiplexing network system according to claim 1, wherein the detailed operational state information corresponding to the at least one sink device includes at least one of sound volume, sound quality, and track number.

9. The multiplexing network system according to claim 1, wherein the master device is configured to store the first management information and the second management information, and the control device is configured to control a data-stream transfer operation performed between the media devices by referring to the stored first and second management information.

10. The multiplexing network system according to claim 9, wherein the plurality of media devices comprise at least one source device for outputting video information to the digital transmission path, and during the output of the video information, the source device compresses and converts the video information in accordance with the compression rate set by the control device in the master device and outputs the compressed and converted video information.

11. The multiplexing network system according to claim 10, wherein the plurality of media devices comprise at least one sink device for receiving video information from the digital transmission path and displaying the video information on a screen, wherein the sink device decompresses the compressed and converted video stream transferred from the source device through the digital transmission path and displays the decompressed video stream on the screen.

12. A digital-information transferring method for multiplexing, in a network system in which a plurality of media devices, including a master device, at least one source device, and at least one sink device, interconnected through a digital transmission path, digital information being synchronously transferring between the media devices, the method comprising:
storing in memory, bandwidth management information accessible by the master device for providing an indication of a bandwidth of a data stream for each of the media devices;
storing in the memory, device-specific state management information accessible by the master device for providing an indication of a type of data output or received by the media devices, and
setting compression rates of the data streams transferred between the media devices to be variable, based on the bandwidth management information and the device-specific state management information, by dividing a maximum bandwidth of the digital transmission path by a sum of bandwidths of the data streams for all media devices;
wherein the at least one source device is configured to output video information to the digital transmission path, and during the output of the video information, the source device compresses and converts the video information in accordance with the compression rate set by the control device, and outputs the compressed and converted video information;
wherein the at least one sink device is configured to receive the video information from the digital transmission path and display the video information on a screen, wherein the at least one sink device decompresses a compressed and converted video stream transferred from the source device through the digital transmission path, and displays the decompressed video stream on the screen;
wherein the control device accesses the bandwidth management information and device-specific state management information during system startup, and when the control device determines that a selected at least one sink device is in a powered-off state, the control device performs control so that the compression rates of the data streams are relaxed with respect to the source devices corresponding to other sink devices in a powered-on state, and relatively large bandwidths are assigned thereto; and
wherein when the control device determines that a selected at least one sink device has changed from a powered-on state to a powered-off state, the control device accesses the device-specific state management information and saves detailed operational state information corresponding to the at least one sink device.

13. The digital-information transferring method according to claim 12, wherein the media devices comprise the source devices and the sink devices, and, by referring to the bandwidth management information and device-specific state management information during the system startup and further based on specification information transferred from each of the source devices and the sink devices connected to a current system, the master device detects a screen display size of each sink device and changes and sets the compression rate of the data stream with respect to the corresponding source device in accordance with the detected screen display size.

14. The digital-information transferring method according to claim 13, wherein, when data streams are simultaneously transferred to a first sink device having a relatively large screen display size and a second sink device having a relatively small screen display size, the master device performs control so that the compression rate of the data stream is changed and set to be small with respect to the source device corresponding to the first sink device and a relatively large bandwidth is assigned thereto and performs control so that the compression rate of the data stream is changed and set to be large with respect to the source device corresponding to the second sink device and a relatively small bandwidth is assigned thereto.

15. The digital-information transferring method according to claim 13, wherein, by referring to the bandwidth management information and device-specific state management information during the system startup and further based on the specification information, the master device detects frame rates of respective video data output from the sources devices corresponding to the respective sink devices and changes and sets the compression rates of the respective data streams in accordance with a ratio of the detected frame rates.

16. The digital-information transferring method according to claim 12, wherein, by referring to the bandwidth management information and device-specific state management information during the system startup, the master device detects the number of data streams simultaneously transferred between the media devices connected to a current system and changes and sets the compression rates of the data streams so that the data streams fit within corresponding bandwidths obtained by dividing an allowable bandwidth by the detected number of streams.

* * * * *